E. SCHNEIDER.
GUN CARRIAGE.
APPLICATION FILED FEB. 14, 1913.

1,085,168.

Patented Jan. 27, 1914.

UNITED STATES PATENT OFFICE.

EUGÈNE SCHNEIDER, OF LE CREUZOT, FRANCE.

GUN-CARRIAGE.

1,085,168.  Specification of Letters Patent.  Patented Jan. 27, 1914.

Application filed February 14, 1913. Serial No. 748,410.

*To all whom it may concern:*

Be it known that I, EUGÈNE SCHNEIDER, a citizen of the Republic of France, and a resident of Le Creuzot, Saône-et-Loire, France, have invented new and useful Improvements in or Relating to Gun-Carriages, which are fully set forth in the following specification.

This invention relates to wheeled gun carriages, and particularly to improvements in the trails of such carriages.

Heretofore, the trails of wheeled gun carriages have been adapted to form shafts for hitching draft animals. In these arrangements the shafts and trail ends form a rigid structure which is badly suited for hitching a draft animal, since no relative lateral movement has been permitted between the draft animal and the load to be drawn. In other words, at each lateral movement of the traveling gun carriage, due to unevenness in the ground, the draft animal, in such structures, is subjected to knocks and twists, and, conversely, each lateral movement of the draft animal that does not correspond to that of the gun carriage, produces strains that are harmful to both animal and apparatus. On the other hand, when the side arms or side pieces of a trail serving as shafts, are connected to the trail body in such a manner as to form a rigid structure, they cannot both be anchored on every kind of ground, unless said ground has been previously leveled.

According to the present invention, the trail extension is constituted by a frame, preferably U-shaped or horse-shoe shaped, formed of two side members hinged together to form thills and connected to the trail body by means of a pivot connection preferably arranged along the longitudinal axis of the trail body or parallel thereto. It results from this construction that a relative transverse movement between the path of the gun carriage and the shafts becomes possible, whereby the stresses harmful to animal and apparatus are avoided and in firing position the trail forms a V-shaped support to give a wide base during firing. The rear ends of the frame may be provided with spades. The shafts can thus be anchored in accordance with the ground without leveling the earth.

In order that the said invention may be clearly understood and readily carried into effect, I will describe the same more fully with reference to the accompanying drawings in which the invention is applied to the carriage of a mountain gun.

Figure 1:
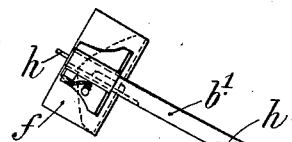
Figure 1:
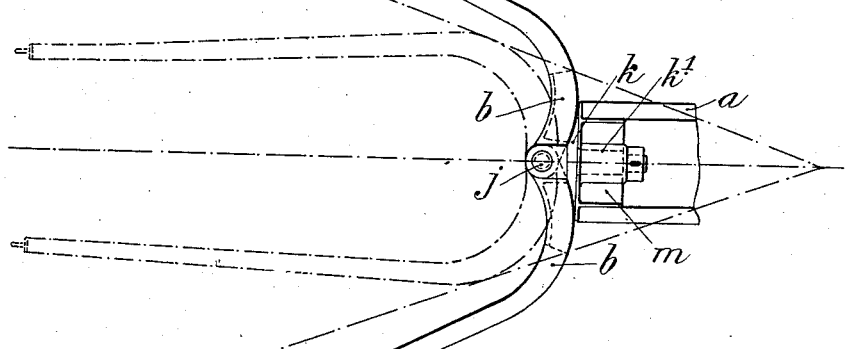
Figure 2:
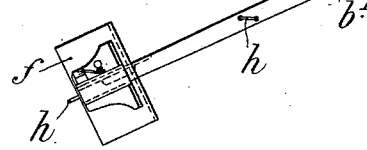
Figure 2:
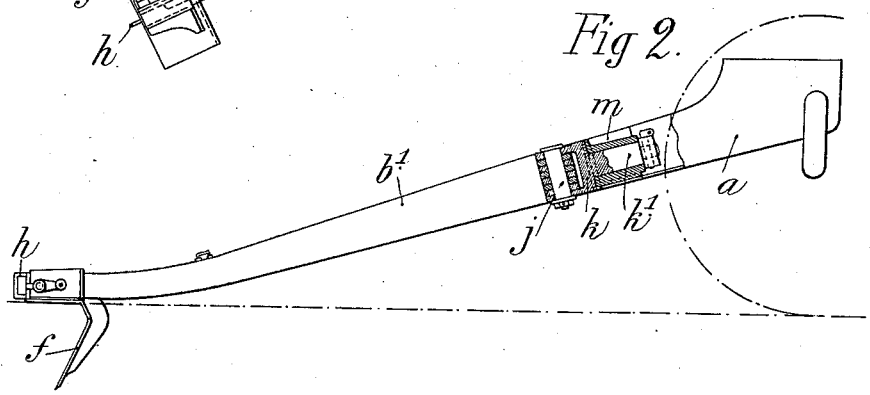

Figure 1 is a plan view of a trail constructed in accordance with my invention; and Fig. 2 is a view partly in elevation and partly in vertical longitudinal section on the line 2—2 of Fig. 1.

In the example shown, the U-shaped frame constituting the limber extension is formed of two members $b'$, $b'$, each of which comprises a shaft or thill and a base portion $b$. These two members $b'$, $b'$ are hinged together by a pin $j$ carried by a fork $k$ provided with a pivot $k'$ arranged along the longitudinal axis of the trail body. The pivot $k'$ has a bearing in a cross piece $m$ carried at the rear end of the trail body $a$. Each shaft $b'$ is adapted to receive a detachable spade $f$ and is provided with a loop $h$ and suitable means for hitching the draft animal to the thills, such as by hame straps not shown. In this construction, when the frame is to serve as a limber freedom of movement is afforded to the draft animal when being placed in position between the sides, owing to the pivoting of the shafts one to the other and to the trail body. When the carriage has been moved to the position it is to occupy when firing, the spades $f$ are connected to the rear ends of the sides $b'$ and the spades can be caused to enter the ground at any desired distance apart and in any plane, thereby furnishing a large supporting base for the gun carriage as is shown in full lines in Fig. 1. The broken lines in this figure show the traveling position of the sides of the frame.

It is obvious that the transverse movability of the shafts $b'$, $b'$ with relation to the trail $a$ may be effected in other ways, such as by passing the pin $k'$ through the end of the trail $a$ and providing bearings on the frame $b$.

Instead of making the thills with jointed connection, they may be made with a rigid connection without sacrificing all the advantages of my improvement. However, I prefer to use the jointed construction for the reasons explained.

I claim:—

1. In combination with a gun carriage, a trail comprising a U-shaped frame adapted to be used as a trail when in firing position and as thills or shafts when traveling and having a pivotal connection with the carriage to permit the frame to swing about an axis lying in the direction of travel of the carriage.

2. In combination with a gun carriage, a trail comprising a U-shaped frame formed of two shafts hinged to each other and adapted to be spread apart when in firing position, said frame having a pivotal connection with the carriage and adapted to swing about an axis lying in the direction of travel of the carriage.

In testimony whereof I have signed this specification in the presence of two subscribing witnesses.

EUGÈNE SCHNEIDER.

Witnesses:
 HANSON C. COXE,
 ROBERT DE SEVELINGER.

Copies of this patent may be obtained for five cents each, by addressing the "Commissioner of Patents, Washington, D. C."